Jan. 18, 1966     H. S. KELLY     3,230,129
PLACEMENT OF RESINOUS TUBING INSIDE A CONDUIT AND SEALED
THEREIN WITH A VISCOUS FLUID

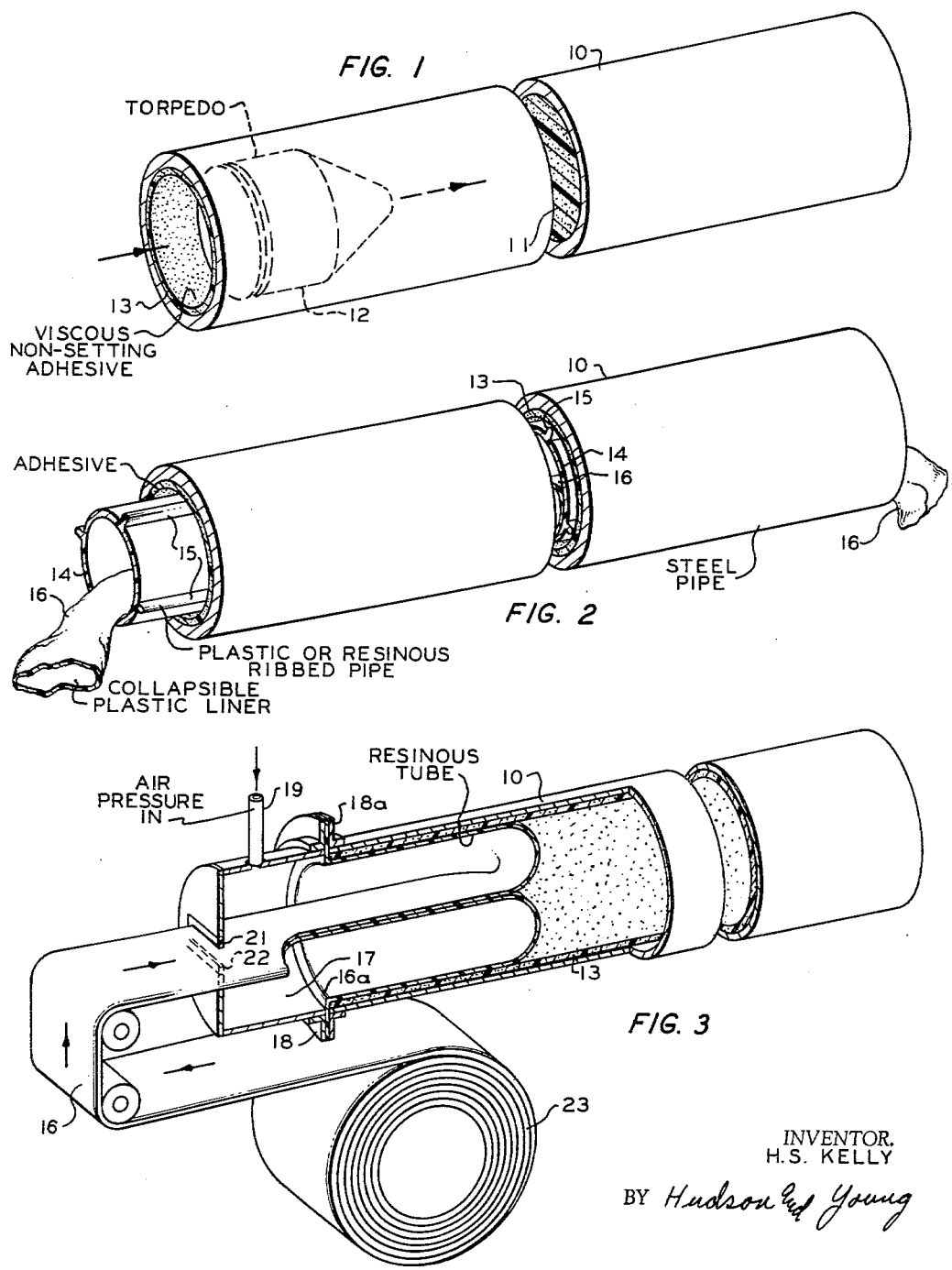

Filed April 3, 1961     2 Sheets-Sheet 2

INVENTOR.
H.S. KELLY

BY Hudson and Young

ATTORNEYS

United States Patent Office 3,230,129
Patented Jan. 18, 1966

3,230,129
PLACEMENT OF RESINOUS TUBING INSIDE A CONDUIT AND SEALED THEREIN WITH A VISCOUS FLUID
Harold S. Kelly, Bartlesville, Okla., assignor to Phillips Petroleum Company, a corporation of Delaware
Filed Apr. 3, 1961, Ser. No. 100,163
1 Claim. (Cl. 156—287)

This invention relates to corrosion resistant conduits. In one aspect the invention relates to a conduit having a resinous lining bonded to the interior of the conduit with a viscous, nonsetting fluid. In another aspect the invention relates to a method for applying a layer of a viscous, nonsetting adhesive to the interior of a conduit and bonding a resinous tube to the adhesive coated surface of the conduit. In still another aspect this invention relates to a method for providing a corrosion resistant liner for high pressure conduit so that the internal pressure exerted upon the conduit rather than upon the corrosion resistant liner.

For many years pipes and other conduits have been lined with hydraulic cement and such cement lined pipes have been used for handling oil field brines and other corrosive fluids, particularly fluids which are encountered in the petroleum industry. While these cement linings have provided a measure of protection for the pipe lines, there have often been failures in such installations which have presented an ever-present problem of detecting and replacing pipe lines or sections of pipe lines wherein the lining has failed. Minute cracks which sometimes occur in the lining, possibly as a result of expansion and contraction of the metal pipe or as a result of flexing the pipe during handling or during use, allow corrosive fluids to penetrate the lining and attack the pipe. Anything which causes a rupture of the hydraulic cement lining will tend to result in failure of the pipe when such pipe is used to transport corrosive fluids. In one particular installation where sulfate-reducing bacteria are known to be present in the crude oil and salt water being transported cement lined steel pipe has been found to be very little better than unlined steel pipe. Such bacteria have been found beneath the cement lining of cement lined pipe; however, if the cement lining allows the fluids being transported to come in contact with the metal pipe, corrosion can result in galvanic action or chemical action in addition to attack by bacteria.

Resinous or plastic materials such as polyvinylchloride, solid polyolefins, nylon, natural and synthetic rubber, and the like, have been proposed for use in conduits transporting corrosive fluids; however, such materials lack the tensile strength required for high pressure service and therefore the use of such materials has been limited.

It is a principal object of this invention to provide a method for coating the interior of a conduit with a viscous fluid and for securing a resinous liner to the coated surface of the conduit. Another object of the invention is to provide a resinous liner for a conduit with a shock absorbing layer of a viscous nonsetting fluid bonding the resinous liner to the conduit. Still another object of the invention is to provide a conduit having a resinous liner therein with a shock absorbing layer of a viscous, nonsetting fluid bonding the resinous liner to the conduit. A further object of the invention is to provide means for coating the interior surface of a conduit with a viscous fluid and for positioning a resinous liner in the conduit in contact with the viscous fluid. Other and further objects and advantages will become evident to one skilled in the art upon study of this disclosure including the detailed description of the invention and the drawing wherein:

FIGURE 1 is a perspective view of one embodiment of the invention wherein the viscous, nonsetting fluid is being applied to the interior of a conduit;

FIGURE 2 is a perspective view of one embodiment of the invention wherein a collapsible, resinous liner is being introduced into a conduit coated with a viscous adhesive;

FIGURE 3 is a sectional view of another modification for introducing a collapsible, resinous tubing into a coated conduit;

Figure 4:
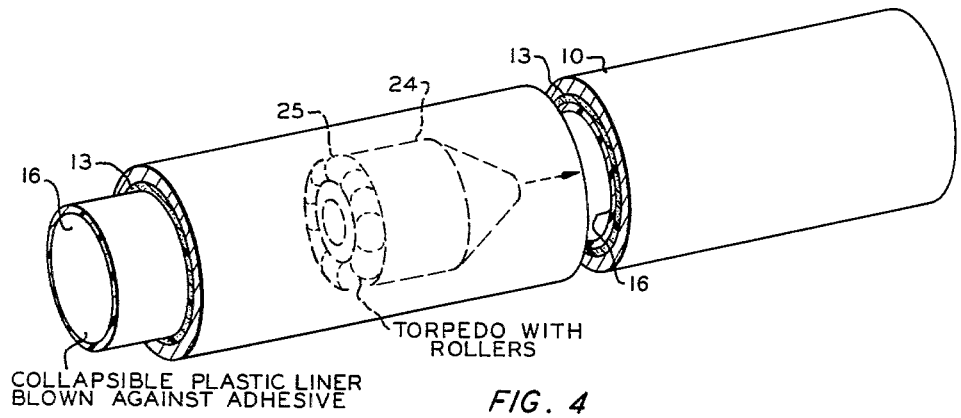
FIGURE 4 is a perspective view of an embodiment of the invention wherein a torpedo is employed to remove air bubbles and voids from between the resinous liner and the coated conduit wall.

Referring now to the drawing and particularly to FIGURE 1, a conduit 10 contains a mass 11 of viscous nonsetting adhesive and a torpedo 12 is being propelled through the conduit 10 leaving a coating 13 on the interior of conduit 10 equal in thickness to the difference between the external dimension of torpedo 12 and the internal dimension of conduit 10. Because of the greater friction of the adhesive with the conduit, on the one hand, as compared to the adhesive with itself, on the other hand, the torpedo will be substantially self-centering, thus producing a substantially uniform layer of adhesive on the pipe surface.

A method for installing a collapsible, resinous liner in the coated conduit is shown in FIGURE 2 wherein the conduit 10, with the layer 13 of adhesive on the inner surface, has introduced therein a rigid tube 14 having a plurality of longitudinal ribs 15 on its outer surface so as to maintain the tube 14 spaced from the layer of adhesive 13. A collapsible liner 16 can then be pulled through the tube 14 by means of a wire line or cable which can be introduced throughout the length of the conduit 10 by known means such as a fluid propelled torpedo. After the collapsible tubing 16 has been pulled throughout the length of the tube 14 and the conduit 10, the tube 14 can be removed. The collapsible tube 16 can then be expanded into contact with the adhesive coated wall of conduit 10 by inflating tube 16 with air or other fluid.

Another method for installing a collapsible, resinous tubing 16 in a coated conduit is shown in FIGURE 3. Conduit 10 with a coating 13 of viscous adhesive has a plenum chamber 17 attached thereto by a suitable connecting means such as bolted flange 18. Conduit 19 supplies a propelling fluid such as compressed air to the plenum chamber 17. A slit 21 having a soft rubber facing 22 admits plastic tubing 16 in flattened form from the supply roll 23 of the resinous tubing. The end of the resinous tubing 16 indicated at 16a can be secured to the conduit 10 by means of the flange connection 18 or can be turned back upon itself a short distance and the turned back portion bonded to the layer of adhesive coating at the end of conduit 10. Having thus secured the end 16a of the resinous tubing 16 to the conduit 10, fluid introduced under pressure via conduit 19 causes the tubing 16 to continue to turn upon itself and is simultaneously expanded into contact with the coated wall of conduit 10. When the resinous tube emerges from the other end of the conduit, the tubing 16 is severed and the trailing noninflated tubing is pulled back through the conduit and rerolled upon roll 23.

After the collapsible tubing is installed and expanded into contact with the adhesive coated inner wall of the conduit, it is usually desirable to press the lining firmly into contact with the adhesive layer so as to remove air bubbles and voids which may exist between the layer of adhesive and the resinous tube. FIGURE 4 illustrates how this can be done by propelling a torpedo 24 through the conduit 10 which is coated with the adhesive 13 and contains the resinous liner 16. The torpedo can be propelled by fluid pressure or pulled through by a wire line or cable. A plurality of rollers 25 on the trailing edge of torpedo 24 presses the resinous liner 16 into sealing contact with the layer of adhesive 13 in conduit 10. The rollers can be spring loaded if desired.

Figure 5:
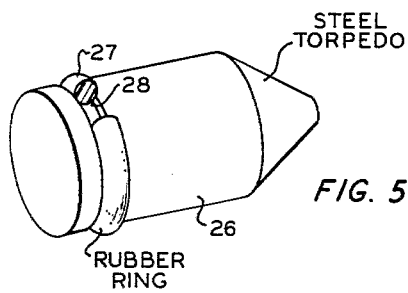
FIGURE 5 is a cross-sectional view of a modification of the torpedo shown in FIGURE 4.

A modification of the torpedo 24 of FIGURE 5 is shown in FIGURE 5 wherein a torpedo 26 has a soft rubber ring 27 positioned in a recess 28 in the body of the torpedo.

Figure 6:
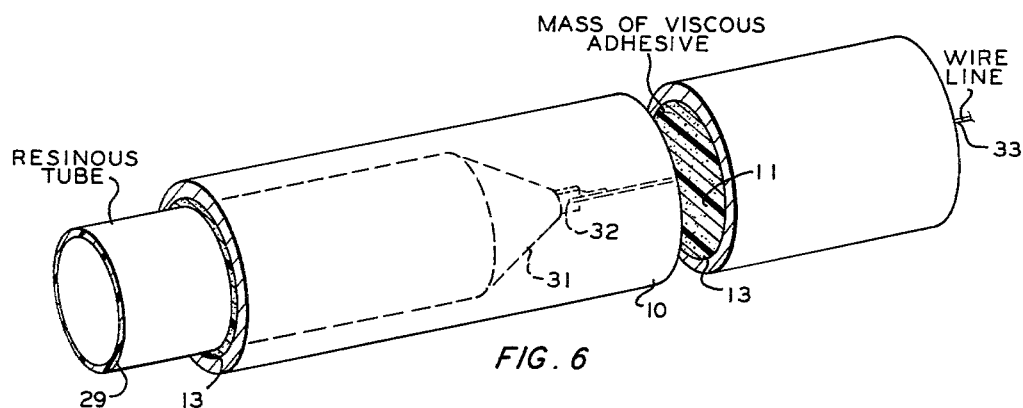
FIGURE 6 is a cross-sectional view of an embodiment of the invention wherein a conduit is coated with a viscous fluid and a resinous liner is placed in the conduit in a single operation.

A modification of the invention wherein a rigid, resinous liner is cemented into a conduit is shown in FIGURE 6 wherein conduit 10 contains a mass of viscous adhesive 11 sufficient to provide the required coating on the inner surface of conduit 10. The resinous tube 29 has a closed end 31 with an eye 32 therein. A wire line or cable 33 extends throughout the conduit 10 and is attached to the eye 32 of the resinous tube 29. The resinous tube 29 is then pulled through the conduit 10, pushing the mass 11 of viscous adhesive ahead and depositing a layer 13 of viscous adhesive on the inner wall of the conduit 10. After the resinous tube 29 is pulled through the conduit 10 the ends of the tube 29 are cut off to complete the installation.

Broadly, the invention contemplates the placement of a resinous tube inside a conduit with a viscous fluid in between the tube and the conduit to provide a shock absorbent, corrosion resistant and scale resistant liner that will automatically adjust to pressure and temperature conditions. The resinous tube can be either rigid or collapsible and a feature of the invention is the provision of means for coating the inside of a previously installed conduit and means for placement of the resinous tube in the previously coated conduit. It is also a feature of the invention that the resinous liner is bonded to the conduit with a viscous, nonsetting fluid or adhesive which, by remaining fluid, will allow adjustment of the resinous liner as it moves differentially to a steel conduit due to the difference in modulus of elasticity between the resin and steel and to form a cushioning fluid to smooth over the pits and joint crevices in the steel pipe so that the resinous tube will be supported on the outside by a smooth and nonscratching support between the conduit and the resinous tube. This will permit the resinous tube to withstand the internal pressures equal to the internal pressure capacity of the conduit.

When installing the cushioned liner of my invention in a conduit, it is advisable to propel a pipe scraper through the pipe or conduit to remove all welding burrs, sharp protrusions, and scale prior to coating the inside of the conduit with the viscous adhesive.

A preferred method for applying a uniform layer of viscous adhesive to the inside of a conduit is illustrated in FIGURE 1 and comprises placing the required amount of adhesive in one end of the conduit and then inserting a torpedo in the conduit wherein the outside dimension of the torpedo is sufficiently smaller than the inside dimension of the conduit so that the annular space between the torpedo and the conduit will represent the desired thickness of the adhesive layer to be placed on the inside surface of the conduit. The torpedo can then be propelled through the conduit by means of a propellant fluid applied to the torpedo or by pulling the torpedo through the conduit with a wire line or cable attached thereto. Torpedoes suitable for this use can be obtained commercially and should be of sufficient length to discourage flow of adhesive past the torpedo.

The placement of a collapsible, resinous liner in the adhesive coated conduit preferably is done without subjecting the collapsible, resinous liner to sliding contact with the coated surface of the conduit, and one method for installing a collapsible, resinous liner is illustrated in FIGURE 2. The ribbed sections of rigid tubing preferably are made of a resin which can be the same as or different from that of the collapsible liner and this rigid tubing can be prepared in manageable lengths and these sections can be welded together as they are inserted into the coated conduit until the entire length of conduit to be lined contains the joined sections of ribbed tube. A wire line or cable can then be positioned throughout the length of the ribbed tubing by means of a fluid operated torpedo or other known methods and this line can then be attached to one end of the collapsible tubing so as to pull the tubing through the ribbed tubing. The ribbed tubing can then be withdrawn from the conduit and cut into manageable lengths as it is withdrawn. The resinous tubing in the coated conduit can then be expanded against the coated surface of the conduit by fluid pressure such as compressed air after which a torpedo, such as shown in FIGURES 4 and 5, can then be propelled through the lined conduit to press the resinous liner against the viscous adhesive and to remove air bubbles or voids that may have occurred in expanding the resinous tube against the coated conduit wall.

A rigid, resinous tubing can be installed by placing the required amount of viscous adhesive in the conduit and by closing the end of the resinous tube to be installed to prevent entry of adhesive to the interior of the resinous tube; the resinous tube can then be installed in the conduit by being pushed through or by being pulled through with a wire line whereby the mass of viscous adhesive is pushed adhead of the closed end of the resinous tube and is distributed upon the inside wall of the conduit so as to result in a substantially void-free cushioning bond between the resinous liner and the conduit.

The resinous tube which provides the impermeable, corrosion-resistant liner can be any impermeable, resinous material such as the so-called organic plastics including solid polymers of olefins, nylon, polyvinylchloride, and the like; and mixtures thereof. A particularly preferred class of materials for making the resinous tubes of this invention is the class of solid linear polymers of 1-olefins, particularly solid linear polyethylene and solid copolymers of ethylene and higher olefins such as propylene, 1-butene, and the like, prepared by the low pressure polymerization of ethylene or copolymerization of ethylene and a higher molecular weight olefin in the presence of an organic diluent and a solid catalyst. Such polyethylene and copolymers can be prepared by the method described in U.S. Patent 2,825,721, issued March 4, 1958, to J. P. Hogan et al.

The viscous nonsetting fluids which are applicable for use as the adhesive materials of the invention include mixtures of pitch, such as coal tar pitch and petroleum pitch, with a halogenated, solid polymer of a 1-olefin as described in U.S. Patent 2,930,726, issued to R. V. Jones et al., March 21, 1960; coal tar; asphaltic tar; epoxy resin glue; rubber cement containing a solvent which is not a solvent for the polyethylene, such as an aromatic solvent if the intended use is at a temperature of not more than about 150 to 200° F.; hydrocarbon gels comprising liquid hydrocarbons containing a gelation agent such as a soap comprising a mixture of aluminum soap of cocoanut oil acid, aluminum naphthenate and aluminum oleate; hydrogenated polybutadiene; and other viscous, nonsetting materials.

The coating of viscous adhesive on the inside surface of the conduit will be a layer of appreciable thickness, that is, it will not be a film such as might be obtained by spraying or brushing a mobile liquid upon a smooth surface. The thickness of the layer of adhesive will vary with the diameter of the conduit and with the expected service requirements of the conduit. The thickness of the layer will commonly be from about 1/64-inch to about 1/4-inch, and in some cases wherein large diameter conduits are employed, 1/2-inch. In any case, the layer of adhesive will be that necessary to transmit the internal pressure in the resinous tube to the outer conduit.

That which is claimed is:

The method of lining a conduit adapted for high pressure service with a collapsible resinous tube incapable of withstanding the internal pressure applied to the conduit so that the internal pressure in the conduit will be borne by the conduit and not by the resinous tube, which method comprises coating the inner surface of the conduit with a continuous and substantially uniform layer of about 1/64 to about 1/2 inch in thickness of a nonsetting viscous adhesive; placing inside and through the adhesive-coated conduit a rigid tube of smaller diameter than that of the conduit and having a plurality of external longitudinal ribs adapted to space the rigid tube from the adhesive-coated wall of the conduit; introducing into and through said rigid tube a collapsed impermeable resinous tube whose external circumference is substantially equal to the coated internal circumference of the conduit; removing said rigid tube from the conduit; and inflating the collapsed tube into contact with the adhesive coating on the conduit wall.

References Cited by the Examiner
UNITED STATES PATENTS

| | | |
|---|---|---|
| 2,377,615 | 6/1945 | Crane. |
| 2,440,725 | 5/1948 | Munger _____ 156—294 X |
| 2,480,358 | 8/1949 | Curtis et al. |
| 2,608,501 | 8/1952 | Kimble _____ 156—294 X |
| 2,686,091 | 8/1954 | Young _____ 156—294 |
| 2,695,255 | 11/1954 | Avery _____ 156—294 |
| 2,721,159 | 10/1955 | Johnston _____ 156—337 |
| 2,724,672 | 11/1955 | Rubin _____ 156—287 |
| 2,745,778 | 5/1956 | Garten _____ 156—287 X |
| 2,794,758 | 6/1957 | Harper et al. _____ 156—287 |
| 2,805,972 | 9/1957 | Cross et al. _____ 156—337 |
| 3,080,269 | 3/1963 | Pollock et al. _____ 156—294 |

EARL M. BERGERT, *Primary Examiner.*

CARL F. KRAFFT, ALEXANDER WYMAN,
*Examiners.*